United States Patent
Seara Martínez et al.

(10) Patent No.: US 11,505,465 B2
(45) Date of Patent: Nov. 22, 2022

(54) METHOD OF OBTAINMENT OF NANOMATERIALS COMPOSED OF CARBONACEOUS MATERIAL AND METAL OXIDES

(71) Applicant: GNANOMAT SL, Madrid (ES)

(72) Inventors: Maria Seara Martínez, Madrid (ES); Alejandra García Gómez, Madrid (ES); Iñigo Larraza Álvarez, Madrid (ES); Elisa Peña Martín, Madrid (ES); Victor Blanco López, Madrid (ES); Sara Ruiz Martínez-Alcocer, Madrid (ES)

(73) Assignee: GNANOMAT SL, Madrid (ES)

( * ) Notice: Subject to any disclaimer, the term of this patent is extended or adjusted under 35 U.S.C. 154(b) by 39 days.

(21) Appl. No.: 17/049,837

(22) PCT Filed: Apr. 24, 2019

(86) PCT No.: PCT/EP2019/060500
§ 371 (c)(1),
(2) Date: Oct. 22, 2020

(87) PCT Pub. No.: WO2019/206989
PCT Pub. Date: Oct. 31, 2019

(65) Prior Publication Data
US 2021/0130172 A1      May 6, 2021

(30) Foreign Application Priority Data

Apr. 25, 2018   (ES) .................................. 201830402

(51) Int. Cl.
*C01B 32/184*   (2017.01)
*B82Y 30/00*    (2011.01)
*B82Y 40/00*    (2011.01)

(52) U.S. Cl.
CPC ............. *C01B 32/184* (2017.08); *B82Y 30/00* (2013.01); *B82Y 40/00* (2013.01)

(58) Field of Classification Search
CPC ...... C01B 32/184; C01B 32/182; C01B 32/15; C01B 32/158; C01B 32/159; C01B 32/16;
(Continued)

(56) References Cited

U.S. PATENT DOCUMENTS

| | | |
|---|---|---|
| 9,145,302 B2 | 9/2015 | Choi et al. |
| 2016/0236939 A1* | 8/2016 | De Miguel Turullois ................... C01B 32/225 |

FOREIGN PATENT DOCUMENTS

| | | |
|---|---|---|
| CN | 105289515 B | 4/2018 |
| EP | 3050844 A1 | 8/2016 |
| WO | 2015044478 A1 | 4/2015 |

OTHER PUBLICATIONS

Wei-Chen Hu, et al., Preparation of Graphene-ZnO Nanocomposites Using a Facile, Green Antisolvent Method, Abstract #2449, 224th ECS Meeting, 2013, recuperado de Internet <URL: http://ma.ecsdl.org/contentMA2013-02/41 /2449.full.pdf +html>, columna 1, figure 1.

(Continued)

*Primary Examiner* — Daniel C. McCracken
(74) *Attorney, Agent, or Firm* — Jacob M. Ward; Ward Law Office LLC

(57) ABSTRACT

Method of obtainment of nanomaterials composed of carbonaceous material and metal oxides. The present invention refers to a method of obtainment of nanomaterials composed of two or more components, wherein at least one of these components is a carbonaceous material and at least another of the components is a metal oxide. The method of the present invention permits preparing these nanomaterials in liquid medium at moderate pressures and temperatures, in (Continued)

industrial quantities, and controlling the physicochemical properties of said nanomaterials by means of control of the parameters of synthesis.

13 Claims, 3 Drawing Sheets

(58) Field of Classification Search
CPC ... C01B 32/162; C01B 32/164; C01B 32/166; C01B 32/168; C01B 32/17; C01B 32/172; C01B 32/174; C01B 32/176; C01B 32/178; C01B 2202/00; C01B 2202/02; C01B 2202/04; C01B 2202/06; C01B 2202/08; C01B 2202/10; C01B 2202/20; C01B 2202/22; C01B 2202/24; C01B 2202/26; C01B 2202/28; C01B 2202/30; C01B 2202/32; C01B 2202/34; C01B 2202/36; B82Y 30/00; B82Y 40/00; C01P 2004/64; D01F 9/12; D01F 9/127; D01F 9/1271; D01F 9/1272; D01F 9/1273; D01F 9/1274; D01F 9/1275; D01F 9/1276; D01F 9/1277; D01F 9/1278; D01F 9/133
See application file for complete search history.

(56) References Cited

OTHER PUBLICATIONS

Ni Y et al., Fabrication of RGO-NiCo2O4 nanorods composite from deep eutectic solvents for nonenzymatic amperometric sensing of glucose, Talanta, Mar. 30, 2018, vol. 185, paginas 335-343, ISSN 0039-9140 (print), <DOI: doi:10.1016/j.talanta.2018.03.097>, apartado: "Preparation of RGO-NiCo2O4 nanorods composite".

Yu, G.; Xie, X.; Pan, L.; Bao, Z.; Cui, E. SciVerse ScienceDirect "Hybrid nanostructured materials for high-performance electrochemical capacitors." Nano Energy 2013, 2 (2), 213-234, 2012.

Sadhana, K.; Shinde, R.S.; and Murthy, S.R. International Journal of Modern Physics B "Synthesis of nanocrystalline YIG using microwave-hydrothermal method." Int. J. Mod. Phys. B 2012, vol. 23, No. 17 (2009) 3637-3642 World Scientific Publishing Company.

Thota, S.; Prasad, B.; Kumar, J. Materials Science and Engineering B "Formation and magnetic behaviour of manganese oxide nanoparticles." Mater. Sci. Eng. B 2010. 167 (3), 153-160.

Dong, J.-E.; Hsu, E.-J.; Wong, D. S.-H.; Lu, S.-E. American Chemical Society "Growth of ZnO nanostructures with controllable morphology using a facile green antisolvent method". J. Phys. Chem. C 2010.114 (19), 8867-8872; Mar. 16, 2010.

Billik, P.; Antal, P.; Gyepes, R. Inorganic Chemistry Communication "Product of dissolution of V2O5 in the choline chloride-urea deep eutectic solvent." Inorg. Chem. Commun. 2015, 60, 37-40.

* cited by examiner

METHOD OF OBTAINMENT OF NANOMATERIALS COMPOSED OF CARBONACEOUS MATERIAL AND METAL OXIDES

CROSS-REFERENCE TO RELATED APPLICATIONS

This application is a United States National Stage Application of PCT/EP2019/060500, filed on Apr. 24, 2019, which in turn claims the benefit of Spanish Patent Application No. ES201830402, filed Apr. 25, 2018. The entire disclosures of the above applications are incorporated herein by reference.

FIELD OF THE INVENTION

The present invention belongs to the technical field of the nanomaterials and in particular to the synthesis of nanomaterials composed of carbonous material, such as graphene or active carbon, and nanoparticles of metal oxides.

BACKGROUND OF THE INVENTION

During the past decade the scientific community has reported a vast number of examples wherein nanomaterials combining graphene and metal oxides exhibit excellent properties of energy storage when employed as electrodes of energy storage systems (ESSs).

In addition, the excellent properties of nanomaterials formed by a carbonous base and nanoparticles of metal oxides have been demonstrated. Nevertheless, in order for these nanomaterials to have access to the ESS market it is necessary to overcome a series of challenges:

Manufacture of these nanomaterials in the form of products suitable for a concrete application and safe for the use thereof. This includes designing them taking into account the final device, the electrolyte, the manner of manufacture of the device, etc.

Production on industrial scale having costs acceptable to the market, that is to say that the properties of the nanomaterials compensate for the increase in price, if any, in relation to the traditional materials.

Furthermore, in terms of the currently existing methods for the obtainment of nanomaterials, a classification may be made into two large groups according to the typology of the process: as a function of the precursors or as a function of the morphology.

In the method of obtainment as a function of the precursors, if the product is obtained from precursors of smaller size it is known as bottom-up, and if it is obtained from precursors of larger size, or in bulk, it is known as top-down. Both methodologies present certain advantages and disadvantages and in each case are employed as a function of the product which it is desired be obtained.

The bottom-up approach is much more widespread in the synthesis of nanoparticles, wherein said nanoparticles may be synthesised in an isolated manner or forming part of another material, nevertheless it implies chemical reactions and they are methodologically more complex processes, the investment costs whereof are very high.

In the case of top-down, products are obtained from structures of greater size and the manufacturing techniques are well known, nevertheless products are obtained having a greater concentration of imperfections and the processes offer less control over the product.

In addition, in terms of the method of obtainment as a function of the morphology, in recent decades new methods of synthesis for the production of hybrids of graphene/nanoparticles have been emerging. These new methods run from novel processes to slight changes in already known procedures yielding the production of a desired product (Yu, G.; Xie, X.; Pan, L.; Bao, Z.; Cui, E. Hybrid nanostructured materials for high-performance electrochemical capacitors. Nano Energy 2013, 2 (2), 213-234).

More specifically, the methods of synthesis for the obtainment of nanomaterials composed of graphene/metal oxides may be classified in the following manner:

(1) Graphene and/or derivatives (r-GO, reduced graphene oxide, and GO, graphene oxide) decorated with nanoparticles.

(2) Nanoparticles encapsulated with graphene or derivatives thereof.

The principal difference between these two classes is the ratio of relative size between the nanoparticles and the lateral dimensions of the carbonous material: when the size of the nanoparticles lies in the range of a few nanometres, the nanoparticles are small and may readily decorate the sheet of graphene. On the other hand, when the particle size becomes comparable to the graphene, this bidimensional carbonous sheet may be utilised to encapsulate the particles, leading to the second type of hybrids.

Although the diversity of techniques for the preparation of nanomaterials is very broad, the techniques of graphene and/or derivatives decorated by nanoparticles are of great interest. These techniques may be divided into in situ and ex situ.

In the in situ technique, the deposition of nanoparticles upon the inert surface of the graphene is realised through the assistance of techniques such as heat treatments (thermal evaporation or decomposition), pulsed laser deposition or sputtering. This technique permits the graphene to remain free of defects permitting good electron mobility. Nevertheless, associated therewith are high pressures ($10^4$ Pa) and high temperatures (>1000° C.) giving a low yield and additionally entailing high costs, precluding the viability thereof on industrial scale.

Among the principal types of in situ techniques are solvothermal/hydrothermal synthesis (Sadhana, K.; Shinde, R. S.; and Murthy, S. R. Synthesis of nanocrystalline YIG using microwave-hydrothermal method. Int. J. Mod. Phys. B 2012, 23), sol-gel synthesis (Thota, S.; Prasad, B.; Kumar, J. Formation and magnetic behaviour of manganese oxide nanoparticles. Mater. Sci. Eng. B 2010. 167 (3), 153-160), reduction of metal precursors/coprecipitation and precipitation from deep eutectic solvents. This latter technique is emphasised by virtue of the fact that, thanks to the work in the search for solvents alternative to the conventional ones to overcome the limitations of the reaction media traditionally employed, the great potential of the deep eutectic solvents (DESs) having a low melting point has become evident in terms of inexpensive and alternative solvents in different fields of chemistry.

Although the majority of the DESs are obtained from ChCl, an ionic species, they should not be considered as traditional ionic liquids by virtue of the fact that they may be obtained from non-ionic species. In addition, on comparison with the ionic liquids, the DESs present a series of advantages inter alia whereof there may be emphasised the low price thereof, the simplicity in the preparation thereof, the biodegradability and non-toxicity thereof. Although the ionic liquids are employed in many fields of nanotechnology there are still very few uses of the analogues thereof (DESs).

For example, the DESs have been used for the synthesis of nanoparticles of metals and metal oxides, such as ZnO (Dong, J.-E.; Hsu, E.-J.; Wong, D. S.-H.; Lu, S.-E. Growth of ZnO nanostructures with controllable morphology using a facile green antisolvent method. J. Phys. Chem. C 2010. 114 (19), 8867-8872) or $V_2O_5$ (Billik, P.; Antal, P.; Gyepes, R. Product of dissolution of $V_2O_5$ in the choline chloride-urea deep eutectic solvent. Inorg. Chem. Commun. 2015, 60, 37-40) by virtue of the excellent properties and the environmental friendliness thereof. On the other hand, it must be emphasised that there is little control upon the morphology of the final products by virtue of the fact that not very much information exists regarding the reaction processes which take place. To this must be added that these solvents degrade at low temperatures (<100° C.).

Another important route for the preparation of composites of carbonous material/MOx (metal oxide) is the dispersion of the premanufactured nanoparticles in the presence of the other material in a solvent. This method is defined as ex situ synthesis of nanocomposites. This synthesis is an alternative method offering good control over the size, shape and functionality of the products. Nevertheless, the ex situ process requires the preparation of the materials by means of one of the methods described in simple terms, in addition to posttreatments modifying the surface of the nanoparticles with the objective of creating non-covalent interactions between the latter and the surface of the bidimensional materials.

In summary, the principal problem of the methods of synthesis of nanomaterials composed of graphene and metal oxides arises when scaling the processes to produce said materials in large quantities. This is due to the difficulty in the scaling of the conditions of synthesis and in the control of the properties of the products.

DESCRIPTION OF THE INVENTION

The present invention solves the current problems in the state of the art by means of a method of obtainment of nanomaterials composed of two or more components, wherein at least one of these components is a carbonaceous material and at least another of the components is a metal oxide.

The method of the present invention permits preparing these nanomaterials in liquid medium at moderate pressures and temperatures, in industrial quantities, and controlling the physicochemical properties of said nanomaterials by means of the control of the parameters of synthesis.

In a first aspect of the invention, the method of obtainment of nanomaterials composed of carbonaceous material and metal oxides comprises the following stages:
  a) Dissolution of a metal oxide in a solvent for 1 to 5 hours;
  b) Catalysation of the solution from stage a) by means of ultrasound at a temperature from 30° C. to 60° C. for 1 to 5 hours;
  c) Addition of a carbonaceous material to the solution from stage a) and dispersion by means of ultrasound; and
  d) Addition of an alkaline solution to the solution resulting from stage c) for the formation of the metal species in the form of nanoparticles.

The homogenisation of phases by means of the use of ultrasound produces a beneficial effect upon the energy storage properties of the resulting product.

It must be emphasised that the speed of mixing between the solution of metal and the alkaline solution (stage d)) has an influence upon the properties of the product obtained. It has been observed that greater speeds of mixing produce nanoparticles of greater size and greater retention of capacitance.

In another aspect of the invention, the metal oxide employed may be ZnO, $Mn_3O_4$, $Fe_3O_4$, $CeO_2$, $MnO_2$, FeO, $Fe_2O_3$, $WO_3$, $SnO_2$, $RuO_2$ and/or $Co_3O_4$.

In another aspect of the invention, the carbonaceous material is graphene, nanoplatelets of graphene, graphene oxide, reduced graphene oxide, graphite, graphite oxide, nanotubes of carbon, nanofibres of carbon or activated carbon.

In another aspect of the invention, the solvent of stage a) of the method is a mixture of water and an organic acid. In another preferable aspect, the organic acid is malonic, citric or oxalic acid.

In another aspect of the invention, the mixture of water and organic acid is prepared in a proportion of 1:6.

Another aspect of the invention is that the solvent of stage a) may be a deep eutectic solvent. In another preferable aspect, the deep eutectic solvent is formed by a mixture of at least a donor of hydrogen bonds and a quaternary ammonium. More preferably, the donor of hydrogen bonds is malonic acid and the quaternary ammonium is choline chloride.

Optionally, stages a) and b) may be repeated with a second metal oxide. In another preferable aspect, the second metal oxide may be ZnO, $Mn_3O_4$, $Fe_3O_4$, $CeO_2$, $MnO_2$, FeO, $Fe_2O_3$, $WO_3$, $SnO_2$, $RuO_2$ and/or $Co_3O_4$.

In another aspect of the invention, the solutions of the first and second metal oxides are mixed and homogenised having the objective of subsequently carrying out stages c) and d) according to the method object of the invention.

In another aspect the invention, a nanomaterial composed of carbonaceous material and metal oxides is provided obtained in accordance with the method and the variants thereof aforedescribed.

The principal advantages of the invention lie in the following points:
  It permits scaling the preparation of nanomaterials in processes not requiring the employment of high pressures nor temperatures.
  In these processes it is possible, by means of the control of the parameters of synthesis, to control the properties of the products.
  The solvents employed do not present any danger in respect of the toxicity or volatility of the components thereof.
  The nanomaterials obtained in these processes present good properties of energy storage in a reproducible manner.

BRIEF DESCRIPTION OF THE FIGURES

Having the objective of facilitating the comprehension of the invention, in an illustrative but not limitative manner, manners of embodiment of the invention shall be described below making reference to a series of figures.

DESCRIPTION OF METHODS OF EMBODIMENT

Example 1

Preparation of Graphene/$Mn_3O_4$ Composite 60 mg of $Mn_3O_4$ (Sigma-Aldrich product number 377473) were added to 40 ml of a solvent composed of a mixture of malonic acid and water in a 1:6 molar ratio. The mixture was subjected to ultrasonic treatment for 1 hour in a sonication bath until dissolution.

60 mg of nanoplatelets of graphene (GrapheneTech product number GP500 801282-5) were then added and the resulting mixture was again homogenised in an ultrasonic bath for a further 1 hour.

Figure 1:
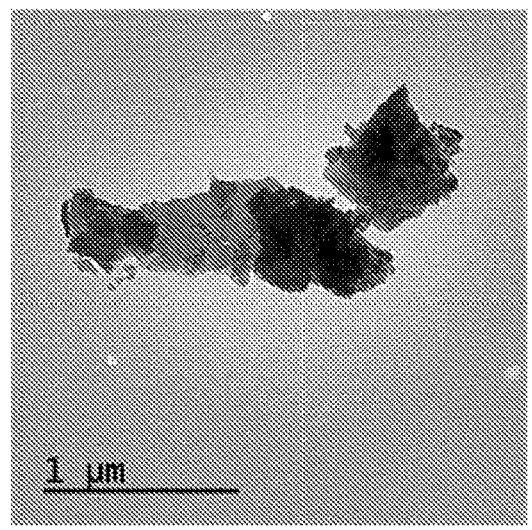
FIG. 1. Electron microscopy image of a nanomaterial composed of graphene and nanoparticles of $Mn_3O_4$.
Figure 2:
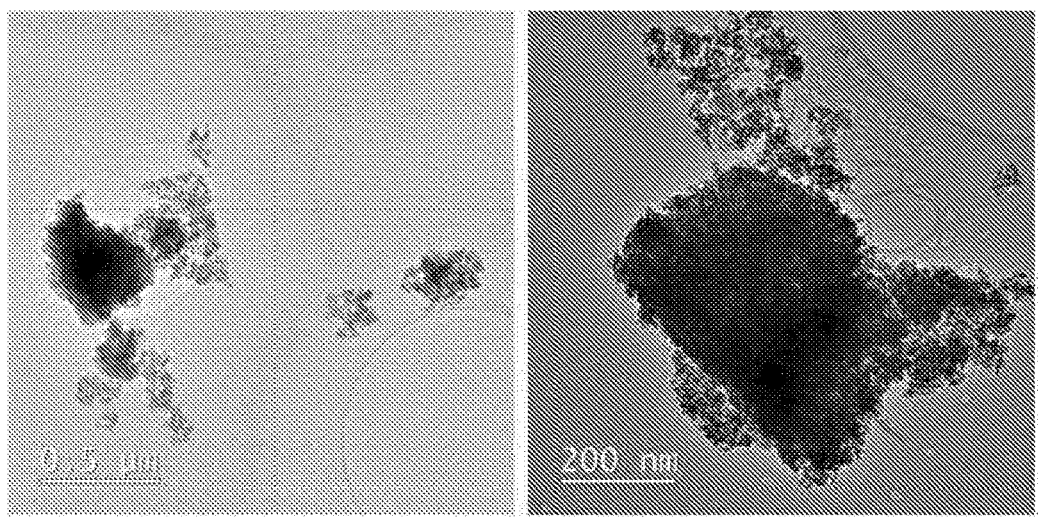
FIG. 2. Electron microscopy images of a nanomaterial composed of active carbon and nanoparticles of $Mn_3O_4$.

500 ml of NaOH (VWR product number 28240.361) 1M was then added at a rate of 6.4 ml/minute whilst the suspension was stirred upon a stirrer plate. The mixture was stirred for a further 30 minutes and was filtered under vacuum through a nylon membrane (0.45 micrometers). The residue was washed with 100 ml of distilled water and then with 100 ml of absolute ethanol and was dried in an oven at 100° C. for 12 hours, there being obtained 120 mg of a dark grey powder. For the analysis of the sample, one milligram of said powder was taken and was dispersed in 5 ml of absolute ethanol during 15 minutes of sonication. Some drops of said dispersion were taken and were added upon a grid of copper coated with carbon and were observed by means of transmission electron microscopy (TEM). The image is shown in FIG. 1.

Example 2

Preparation of Graphene/$Mn_3O_4$/$Fe_3O_4$ Composite 20 mg of $Fe_3O_4$ (Sigma-Aldrich 637106) were added to a previously prepared mixture composed of choline chloride and malonic acid in a 1:6 molar ratio. The whole was submitted to ultrasound for 20 hours in a sonication bath until dissolution.

In addition, a mixture was prepared composed of malonic acid and water in a 1:6 molar ratio, whereto 30 mg of $Mn_3O_4$ (Sigma-Aldrich 377473) were added and were dissolved following 1 hour of ultrasonic treatment in a sonication bath.

Both solutions were mixed by means of sonication for a further 1 hour in an ultrasonic bath and following this period 50 mg of graphene nanoplatelets (Graphene-Tech product number GP500 801282-5) were added and the resultant mixture was again homogenised in an ultrasonic bath for a further 1 hour.

Figure 3:
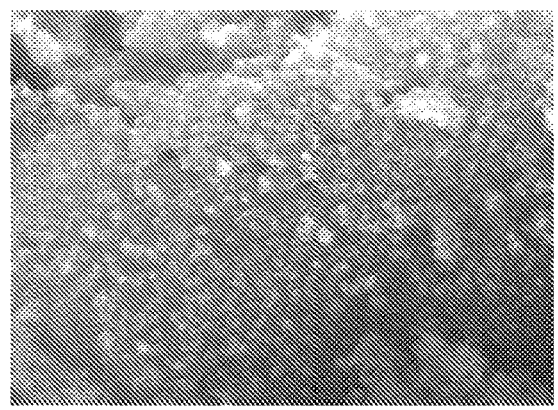
FIG. 3. Electron microscopy image of a nanomaterial composed of graphene and nanoparticles of $Mn_3O_4$ and $Fe_3O_4$.

40 ml of an aqueous solution of NaOH (VWR product number 28240.361) 1M were then added, whereafter an additional 400 ml of an aqueous solution of NaOH 5M were added. Following stirring the mixture, the resultant solid was filtered under vacuum, washed with distilled water and then with 100 ml of absolute ethanol and it was dried in an oven at 100° C. for 12 hours, there being obtained 100 mg of a dark grey powder. The sample was analysed by scanning electron microscopy (SEM), utilising therefore 5 mg of material without modification. The image is shown in FIG. 3.

Example 3

Preparation of Graphene/ZnO Composite

Firstly, a solution was prepared composed by a mixture of malonic acid and water in a 1:6 molar proportion. Subsequently 60 mg of ZnO (Aldrich 14439) were added to 30 ml of said solution and the mixture was submitted to ultrasound for 90 minutes in an ultrasonic bath. 60 mg of graphene nanoplatelets (Graphene-Tech product number GP500 801282-5) were then added and the resulting mixture was again homogenised in an ultrasonic bath for a further 90 minutes.

400 ml of a solution of NaOH 1M were added until pH 12, under constant stirring, followed by 1 hour of sonication in an ultrasonic bath. Finally, the mixture was filtered, washed with distilled water and ethanol and dried in an oven for 12 hours at 100° C., there being obtained 99.5 mg of a black material.

Figure 4:
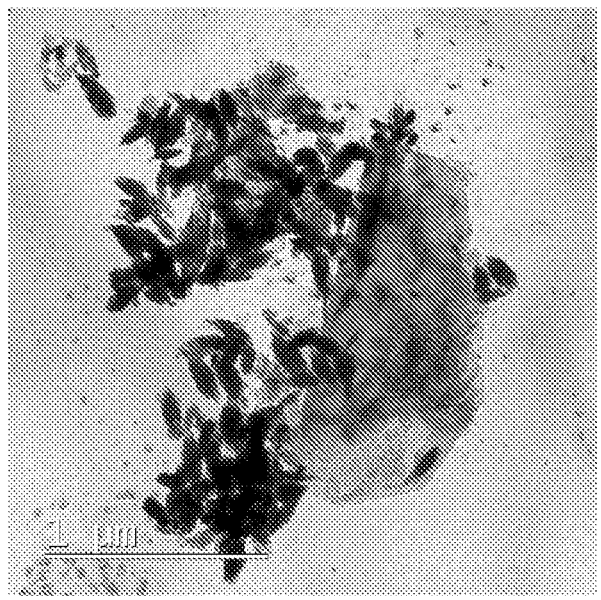
FIG. 4. Electron microscopy image of a nanomaterial composed of graphene and nanoparticles of ZnO.

For the analysis of the sample, one milligram of said powder was taken and was dispersed in 5 ml of absolute ethanol by means of 15 minutes sonication. A few drops of said dispersion were taken and were added upon a grid of copper coated with carbon and were observed by means of transmission electron microscopy (TEM). The image is shown in FIG. 4.

Example 4

Preparation of Graphene/$Mn_3O_4$/ZnO Composite 50 mg of ZnO were added to 20 ml of a solvent formed by a mixture of malonic acid and water in a 1:6 molar proportion. In a similar and independent manner, 30 mg of $Mn_3O_4$ were added to 20 ml of a solvent identical to the foregoing one. Both mixtures were sonicated in an independent manner in an ultrasonic bath for 1 h until completion of dissolution of the metal oxides.

Both solutions were then mixed and 80 mg of graphene nanoplatelets were added. The new mixture was sonicated for a further 1 hour and 100 ml of a solution of NaOH 5M were then added under mechanical stirring with a magnetic rod.

When the pH of the mixture attained a value of 12, the solid present in the medium was separated by filtration under vacuum, it was washed with distilled water, ethanol. Finally, it was dried in an oven at 100° C. for 12 hours, there being obtained 157 mg of a dark material.

Figure 5:
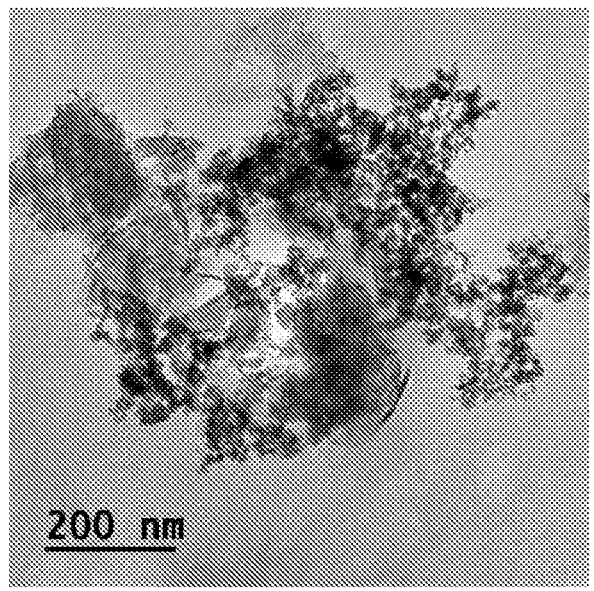
FIG. 5. Electron microscopy image of a nanomaterial composed of graphene and nanoparticles of $Mn_3O_4$ and ZnO.

For the analysis of the sample, one milligram of said powder was taken and was dispersed in 5 ml of absolute ethanol by means of 15 minutes sonication. A few drops of said dispersion were taken and were added upon a grid of copper coated with carbon and were observed by means of transmission electron microscopy (TEM). The image is shown in FIG. 5.

Example 5

Preparation of Graphene/$Mn_3O_4$/Ag Composite 30 mg of $Mn_3O_4$ were added to a 30 ml of a solution composed of a mixture of malonic acid and water in a 1:6 molar proportion and the mixture was sonicated in an ultrasonic bath for 2 hours. 15.75 mg of $AgNO_3$ were then added to the mixture and were dissolved whilst ultrasound was applied for a further 30 minutes.

50 mg of graphene nanoplatelets (Graphene-Tech product number GP500 801282-5) were added to the foregoing mixture and the entire system was sonicated for a further hour.

A magnetic rod was incorporated into the mixture and it was stirred whilst 25 mg of $NaBH_4$ were slowly added. After 30 minutes, 300 ml of an NaOH solution 1M were added until an alkaline pH. Finally, the solid present in the mixture was filtered under vacuum, it was washed with distilled water and ethanol and was dried in an oven at 100° C. for 12 hours.

Figure 6:
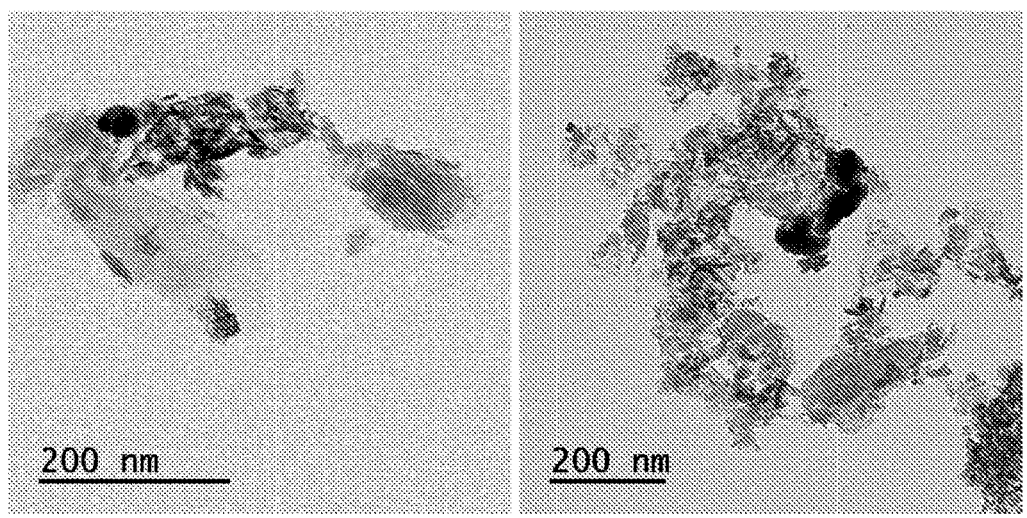
FIG. 6. Electron microscopy image of a nanomaterial composed of graphene and nanoparticles of $Mn_3O_4$ and Ag.

The resulting mixture was filtered under vacuum and the solid obtained was washed with distilled water and ethanol and was finally dried at 100° C. for 12 h. For the analysis of the sample, one milligram of said powder was taken and was dispersed in 5 ml of absolute ethanol by means of 15 minutes sonication. A few drops of said dispersion were taken and were added upon a grid of copper coated with carbon and were observed by means of transmission electron microscopy (TEM). The image is shown in FIG. 6.

Example 6

Preparation of Active Carbon/$Mn_3O_4$/$Fe_3O_4$ Composite 30 mg of $Mn_3O_4$ and 20 mg of $Fe_3O_4$ were added to an aqueous solution of oxalic acid 0.1 M and the mixture was subjected to sonication in an ultrasonic bath for approximately one hour until all the solid material was completely dissolved. 50 mg of activated carbon (Haycarb HCE 202) were then added to the foregoing mixture and the whole was sonicated for a further 30 minutes. Subsequently, 10 ml of an aqueous solution of NaOH 5M were then added slowly to the mixture whilst the whole was vigorously stirred with a magnetic rod.

Finally, the mixture was filtered under vacuum, there being obtained a dark material which was washed with distilled water, ethanol and was dried in an oven at 100° C.

Figure 7:
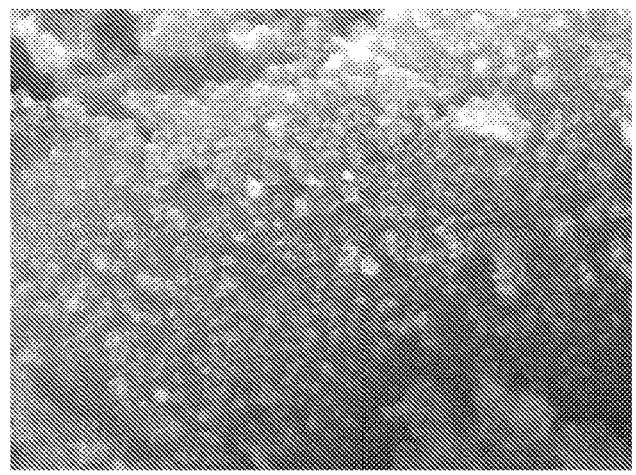
FIG. 7. Electron microscopy image of a nanomaterial composed of activated carbon and nanoparticles of $Mn_3O_4$ and $Fe_3O_4$.

The sample was analysed by scanning electron microscopy (SEM), utilising for the purpose 5 mg of material without modification. The image is shown in FIG. 7.

Example 7

Preparation of Graphene/Nanotubes of Carbon/$Mn_3O_4$/$Fe_3O_4$ Composite 30 mg of $Mn_3O_4$ and 20 mg of $Fe_3O_4$ were added to an aqueous solution of oxalic acid 0.1 M and the mixture was subjected to sonication in an ultrasonic bath, for approximately one hour, until all the solid material was completely dissolved. 30 mg of nanoplatelets of graphene (GrapheneTech product number GP500 801282-5) and 20 mg of nanotubes of carbon (Carbon Solutions, Inc. AP-SWNT) were then added to the foregoing mixture and the whole was sonicated for a further 30 minutes. Subsequently, 10 ml of an aqueous solution of NaOH 5M were then added slowly to the mixture whilst the whole was vigorously stirred with a magnetic rod.

Finally, the mixture was filtered under vacuum, there being obtained a dark material which was washed with distilled water, ethanol and was dried in an oven at 100° C.

Figure 8:
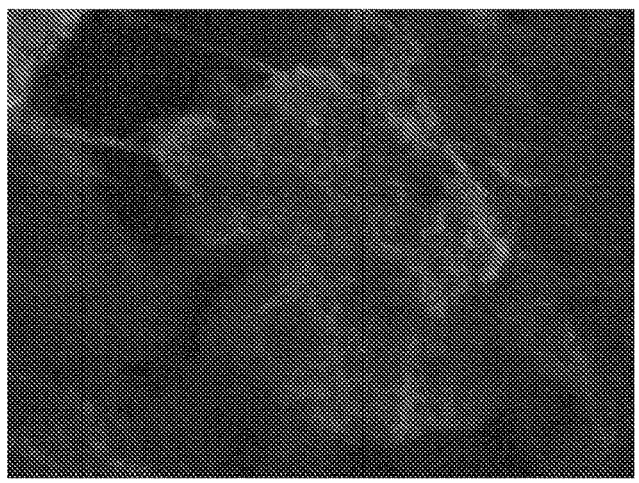
FIG. 8. Electron microscopy image of a nanomaterial composed of graphene/nanotubes of carbon/$Mn_3O_4$/$Fe_3O_4$.

The sample was analysed by scanning electron microscopy (SEM), utilising for the purpose 5 mg of material without modification. The image is shown in FIG. 8.

Example 8

Preparation of Graphene Oxide/$Mn_3O_4$ Composite 40 mg of $Mn_3O_4$ were added to a solution composed of a mixture of malonic acid and water in a 1:6 molar proportion and the mixture was submitted to sonication in an ultrasonic bath for approximately one hour until complete dissolution of the solid. 10 ml of a suspension of graphene oxide having a concentration of 4 g/l (Graphenea Graphene Oxide GO) were then added to said mixture and the whole was subjected to sonication for a further hour in an ultrasonic bath. In the following stage 150 ml of an aqueous solution of NaOH 5 M were added and the mixture was again sonicated for a further 1 hour. Finally, the solid present in the medium was separated by filtration under vacuum, it was washed with distilled water and ethanol and it was dried in an oven at 100° C., there being obtained 79 mg of a solid black material.

Example 9

Preparation of Reduced Graphene Oxide/$Mn_3O_4$ Composite 75 mg of $Mn_3O_4$ were added to a solution composed of a mixture of malonic acid and water in a 1:6 molar proportion and the mixture was sonicated in an ultrasonic bath for approximately one hour until complete dissolution of the oxide. 70 mg of reduced graphene oxide (Graphenea Reduced Graphene Oxide rGO) were then added and the mixture was sonicated for a further hour. 150 ml of an aqueous solution of NaOH 5 M were then added and entire mixture was stirred with a magnetic rod for a further hour. The resultant solid was separated by filtration under vacuum, it was washed with distilled water and ethanol and it was dried in an oven at 100° C., there being obtained 149.5 mg of a dark solid material.

The invention claimed is:

1. A method of obtainment of a nanomaterial, the method comprising the following stages:
    a) Dissolution of a first metal oxide in a solvent for 1 to 5 hours to provide a first solution;
    b) Catalysation of the first solution from stage a) by means of ultrasound at a temperature from 30° C. to 60° C. for 1 to 5 hours;
    c) Addition of a carbonaceous material to the first solution from stage a) and dispersion by means of ultrasound; and
    d) Addition of an alkaline solution to the first solution from stage c) for the formation of a metal species in the form of nanoparticles.

2. The method-according to claim 1, wherein the first metal oxide is selected from a group consisting of ZnO, $Mn_3O_4$, $Fe_3O_4$, $CeO_2$, $MnO_2$, FeO, $Fe_2O_3$, $WO_3$, $SnO_2$, $RuO_2$, $Co_3O_4$, and combinations thereof.

3. The method according to claim 1, wherein the carbonaceous material is selected from a group consisting of graphene, nanoplatelets of graphene, graphene oxide, reduced graphene oxide, graphite, graphite oxide, nanotubes of carbon, nanofibres of carbon, and activated carbon.

4. The method according to claim 1, wherein the solvent of stage a) is a mixture of water and an organic acid.

5. The method according to claim 4, wherein the mixture of water and organic acid is in a molar proportion of 1:6.

6. The method according to claim 4, wherein the organic acid is malonic, citric or oxalic acid.

7. The method according to claim 1, wherein the solvent of stage a) is a deep eutectic solvent.

8. The method according to claim 7, wherein the deep eutectic solvent is formed by a mixture of at least one hydrogen bond donor and one quaternary ammonium.

9. The method according to claim 8, wherein the hydrogen bond donor is malonic acid and the quaternary ammonium is choline chloride.

10. The method according to claim 1, wherein stages a) and b) are repeated with a second metal oxide to provide a second solution.

11. The method according to claim 10, wherein the second metal oxide is selected from a group consisting of ZnO, $Mn_3O_4$, $Fe_3O_4$, $CeO_2$, $MnO_2$, FeO, $Fe_2O_3$, $WO_3$, $SnO_2$, $RuO_2$, $Co_3O_4$, and combinations thereof.

12. The method according to claim 10, wherein the first and second solutions of the first and second metal oxides are mixed and homogenised for the purpose of subsequently carrying out stages c) and d) according to the method described in claim 1.

13. The method according to claim 1, wherein the alkaline solution includes hydroxide.

\* \* \* \* \*